(12) United States Patent
Bradford et al.

(10) Patent No.: US 9,410,421 B2
(45) Date of Patent: Aug. 9, 2016

(54) SYSTEM AND METHOD FOR MICROSEISMIC ANALYSIS

(75) Inventors: Ian Bradford, Cambridge (GB); Bassem Khadhraoui, Cambridge (GB); Pierre Tardif D'Hamonville, Stavanger (NO)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 776 days.

(21) Appl. No.: 13/517,229

(22) PCT Filed: Dec. 10, 2010

(86) PCT No.: PCT/IB2010/003314
§ 371 (c)(1),
(2), (4) Date: Dec. 18, 2012

(87) PCT Pub. No.: WO2011/077223
PCT Pub. Date: Jun. 30, 2011

(65) Prior Publication Data
US 2013/0081805 A1    Apr. 4, 2013

Related U.S. Application Data

(60) Provisional application No. 61/288,640, filed on Dec. 21, 2009.

(51) Int. Cl.
*G01V 1/40* (2006.01)
*E21B 47/14* (2006.01)
*E21B 49/00* (2006.01)
*G01V 1/28* (2006.01)

(52) U.S. Cl.
CPC .............. *E21B 49/00* (2013.01); *G01V 1/288* (2013.01); *G01V 1/40* (2013.01); *G01V 2210/123* (2013.01)

(58) Field of Classification Search
CPC ......... E21B 47/12; E21B 47/14; G01V 1/003; G01V 1/28; G01V 1/288; G01V 1/301; G01V 1/34; G01V 1/345; G01V 1/40

USPC ............................................ 181/122; 367/25
See application file for complete search history.

(56) References Cited

U.S. PATENT DOCUMENTS 5,917,160 A * 6/1999 Bailey .......................... 181/112
6,856,575 B2   2/2005 Jones
(Continued)

FOREIGN PATENT DOCUMENTS

WO    2004070424 A1    8/2004
WO    2005006020 A1    1/2005
(Continued)

OTHER PUBLICATIONS

Drew et al., "SPE 95513: Automated microseismic event detection and location by continuous spatial mapping," SPE International, 2005: pp. 1-7.
(Continued)

*Primary Examiner* — Kenneth L Thompson (57) ABSTRACT

This invention provides a method for characterizing natural fracture networks or other textural networks in an Earth formation when using microseismic monitoring of a hydraulic fracturing job. The method comprises receiving (120) microseismic data from a hydraulic fracturing event, identifying a data subset (153) comprising components of the microseismic data associated with the one or more hydraulic fractures; and obtaining a remainder dataset (156) of the microseismic data by removing the subset from the microseismic data. One approach for identifying the data subset, after removing high uncertainty microseismic events, is to create a Voronoi diagram of a plurality of cells each associated with one of the microseismic events, determine a density for each cell, create a connectivity matrix of the high density cells and identify event clusters in the connectivity matrix which are aligned with a main growing direction of the hydraulic fracture.

25 Claims, 10 Drawing Sheets

(56) References Cited

U.S. PATENT DOCUMENTS

| | | |
|---|---|---|
| 6,947,843 B2 | 9/2005 | Fisher et al. |
| 6,981,550 B2 | 1/2006 | Håheim et al. |
| 7,391,675 B2 | 6/2008 | Drew |
| 7,596,056 B2 | 9/2009 | Keskes et al. |
| 7,660,198 B2 | 2/2010 | Arrowsmith et al. |
| 2003/0193838 A1* | 10/2003 | Dunn et al. ............ 367/68 |
| 2005/0060099 A1 | 3/2005 | Sorrells et al. |
| 2005/0143923 A1* | 6/2005 | Keers et al. ........... 702/14 |
| 2005/0174885 A1 | 8/2005 | Robinson |
| 2005/0190649 A1 | 9/2005 | Eisner et al. |
| 2005/0190650 A1 | 9/2005 | Ferber et al. |
| 2007/0272407 A1 | 11/2007 | Lehman et al. |
| 2008/0004847 A1* | 1/2008 | Bradford ............... 703/10 |
| 2009/0125240 A1 | 5/2009 | den Boer et al. |
| 2009/0157419 A1 | 6/2009 | Bursey |
| 2009/0290449 A1* | 11/2009 | Smith et al. ........... 367/38 |
| 2010/0157730 A1 | 6/2010 | Bradford |
| 2011/0054797 A1 | 3/2011 | Williams |

FOREIGN PATENT DOCUMENTS

| | | |
|---|---|---|
| WO | 2010073072 A1 | 7/2010 |
| WO | 2011077227 | 6/2011 |

OTHER PUBLICATIONS

Edelsbrunner et al., "On the shape of a set of points in the plane," IEEE Transactions on Information Theory, Jul. 1983, vol. IT-29(4): pp. 551-559.

Eisner et al., "SPE 110813: New analytical techniques to help improve our understanding of hydraulically induced microseismicity and fracture propagation," SPE International, 2007: pp. 1-7.

Overby et al., "Automatic 3D building reconstruction from airborne laser scanning and cadastral data using Hough transform," ISPRS Congress, Istanbul, Turkey, Jul. 2004: pp. 1-6.

Rutledge et al., "Faulting induced by forced fluid injection and fluid flow forced by faulting: an interpretation of hydraulic-fracture microseismicity, Carthage Cotton Valley Gas Field, Texas," Bulletin of the Seismological Society of America, Oct. 2004, vol. 94(5): pp. 1817-1830.

Rutledge et al., "Hydraulic stimulation of natural fractures as revealed by induced microearthquakes, Carthage Cotton Valley gas field, east Texas," Geophysics, 2003, vol. 68(2): pp. 441-452.

Sarti et al., "Detection and characterisation of planar fractures using a 3D Hough transform," Signal Processing, 2002, vol. 82: pp. 1269-1282.

Triebel et al., "Using hierarchical EM to extract planes from 3D range scans," Proceedings of the 2005 IEEE International Conference on Robotics and Automation, Apr. 2005: pp. 4437-4442.

Williams et al., "Quantitative interpretation of major planes from microseismic event locations with application in production prediction," SEG Denver Annual Meeting, 2010: pp. 2085-2089.

International Search Report and Written Opinion PCT Application No. PCT/IB2010/003314 dated Jul. 29, 2011: pp. 1-3.

Khadhraoui et al., "Real-time detection and localization of microseismic events," SEG Denver 2010 Annual Meeting, 2010: pp. 2146-2150.

Raymer et al., "Semiautomated relative picking of microseismic events," SEG Las Vegas 2008 Annual Meeting, 2008: pp. 1411-1414.

* cited by examiner

SYSTEM AND METHOD FOR MICROSEISMIC ANALYSIS

CROSS-REFERENCE TO RELATED APPLICATIONS

This application is a U.S. National Stage Application under 35 U.S.C. §371 and claims priority to PCT Application Number PCT/IB2010/003314 filed Dec. 10, 2010 which claims benefit of U.S. Provisional Patent Application Ser. No. 61/288640 filed Dec. 21, 2009. Both of these applications are incorporated herein by reference in their entireties.

FIELD OF THE INVENTION

The present invention relates generally to the field of microseismic analysis of Earth formations. More specifically, but not by way of limitation, embodiments of the present invention relate to using microseismic analysis to characterize natural fractures or other textural elements in the Earth formation. Some embodiments of the invention have application to hydrocarbon exploration and production where the hydrocarbon reservoir has natural fractures, as is the case with some shale reservoirs.

BACKGROUND OF THE INVENTION

Microseismic measurements can be characterized as a variant of seismics. In conventional seismic explorations a seismic source placed at a predetermined location, such as one or more airguns, vibrators or explosives, is activated and generates sufficient acoustic energy to cause acoustic waves to travel through the Earth. Reflected or refracted parts of this energy are then recorded by seismic receivers such as hydrophones and geophones.

In passive seismic or microseismic monitoring there is no actively controlled and triggered seismic source at a known location. The seismic energy is generated through so-called microseismic events caused by subterranean shifts and changes that at least partially give rise to acoustic waves which in turn can be recorded using suitable receivers. Although the microseismic events may be a consequence of human activity disturbing the subterranean rock, they are quite different from operation of equipment provided as an active seismic source. Relevant background information on instruments and methods for microseismic monitoring can be found for example in the U.S. Pat. Nos. 6,856,575 ; 6,947, 843; and 6,981,550 as well as the published international applications WO 2004/0702424; WO 2005/006020; and the published United States application no. 2005/01900649 A1.

A specific field within the area of passive seismic monitoring is the monitoring of hydraulic fracturing. Such a hydraulic fracturing operation includes pumping large amounts of fluid to induce cracks in the earth, thereby creating pathways via which the oil and/or gas may flow. After a crack is generated, sand or some other proppant material is commonly injected into the crack to prevent it from closing completely when pumping stops. The proppant particles placed within the newly formed fracture keep it open as a conductive pathway for the oil and/or gas to flow into the wellbore. In the hydrocarbon industry, hydraulic fracturing of a hydrocarbon reservoir may be referred to as "stimulation" as the intent is to stimulate the production of the hydrocarbons.

In the field of microseismic monitoring the acoustic signals generated in the course of a fracturing operation are treated as microseismic events. However, use is made of the information available from the fracturing operation, such as timing and pressure. A well-known example of a set of microseismic data is the Carthage Cotton Valley data, evaluated for example by James T. Rutledge and W. Scott Phillips in: "Hydraulic stimulation of natural fractures as revealed by induced microearthquakes. Carthage Cotton Valley gas field, east Tex.", Geophysics Vol. 68, No 2 (Mar.-Apr. 2003), pp. 441-452. Data relevant for this invention are found in: Rutledge, J. T., Phillips, W. S. and Mayerhofer, M. J., "Faulting induced by forced fluid injection and fluid flow forced by faulting: an interpretation of the hydraulic fracture microseismicity, Carthage Cotton Valley Gas field, Tex.", Bulletin of the Seismological Society of America, Vol. 94, No. 5, pp. 1817-1830, Oct.2004.

Microseismic monitoring of hydraulic fracturing is a relatively recent, but established technology. In general, such monitoring is performed using a set of geophones located in a vertical well in the proximity of the hydraulic fracturing.

In microseismic monitoring, a hydraulic fracture is created down a borehole and data received from geophones, hydrophones and/or other sensors is processed to provide for monitoring the hydraulic fracturing. Typically the sensors are used to record microseismic wavefields generated by the hydraulic fracturing. By inverting the obtained microseismic wavefields, locations of microseismic events may be determined as well as uncertainties for the determined locations, source mechanisms and/or the like. The set of event locations and the corresponding uncertainties is known as the microseismic event cloud.

In general, the microseismic monitoring is used so that an understanding of the location and size of the fracture can be ascertained. The spread of the fracture through an Earth formation may also be monitored. This data may be used to help manage the fracturing of the Earth formation for hydrocarbon production or the like and or for interpretation/projection of hydrocarbon production through the hydraulically fractured Earth formation.

Current microseismic processing techniques provide for deriving the location and origin time of microseismic events. Recently, microseismic processing has been developed to allow for enhanced real-time decision making capabilities based on received microseismic data. Microseismic monitoring can also be performed with geophones located in multiple wells. In general, the algorithms for processing microseismic data are used to yield a cloud of microseismicity around the hydraulic fracture. Similarities in the waveforms from events at different locations, albeit with the same focal mechanism, may be used to increase the precision of the relative locations of these events. This may provide for increased resolution, similar to that produced by measurements made at a finer temporal resolution.

In the current microseismic processing techniques, algorithms and other processes are used to identify microseismic data, microseisms, associated with the fracture or fractures produced in the microseismic event. As such, the microseismic data is processed so that microseisms associated with the fracture(s) is identified and this data is further processed to make determinations about the fracture(s).

Earth models contain data which characterise the properties of, and surfaces bounding, the geological features which form the earth's sub-surface, such as rock formations and faults. They are used to assist operations occurring in the earth's sub-surface, such as the drilling of an oil or gas well, or the development of a mine.

The domain of applicability of an earth model varies greatly and should be considered on a case by case basis. Some earth models are applicable only in the near vicinity of a particular oil or gas well, or mine. Others may be valid for an entire oil or gas field, or perhaps even over a region such as the North Sea or Gulf of Mexico. An Earth model for a hydrocarbon reservoir may of course also be referred to as a reservoir model.

The data in an earth model consists of measurements gathered during activities such as the seismic, logging or drilling operations of the oil and gas industry, and of interpretations made from these measurements. The data may be gathered above, on, or below the Earth's surface.

As the duration or number of sub-surface operations increases, more data is gathered. This data can be used to amend the relevant earth model, with the aim that it should characterise the geology and properties ever more accurately. Clearly, it will be conducive to the efficiency of these operations if amendments which enhance the accuracy of the earth model are made as quickly as possible, or appropriate.

BRIEF SUMMARY OF THE INVENTION

Embodiments of the present invention provide for characterizing natural fracture networks or other textural networks in an Earth formation. One embodiment of the present invention provides for determining microseismicity generated by a hydraulic fracturing event and using the microseismicity associated with natural fractures and/or other textural networks to characterize the natural fracture networks or other textural networks.

In certain embodiments of the present invention, a method for characterizing natural fracture networks or other textural networks in an Earth formation is provided, the method comprising:

receiving microseismic data from a hydraulic fracturing event;

identifying a subset of the microseismic data associated with one or more fractures produced by the hydraulic fracturing event, wherein the subset of the microseismic data comprises components of the microseismic data associated with the one or more hydraulic fractures; and obtaining a remainder dataset of the microseismic data by removing the subset from the microseismic data.

These steps may be followed by processing the remainder dataset of the microseismic data to characterize the natural fracture networks or the other textural networks.

The method may be incorporated as part of a hydraulic fracturing operation comprising pumping a fracturing fluid via a wellbore into a reservoir penetrated by the wellbore, to create one or more hydraulic fractures in the reservoir formation. Part or all of method may be performed by a processor which is programmed computer. The characterization of the natural fracture networks or other textural networks may be presented in visual form, such as output to a visual display or a printer. Alternatively or in addition it may be stored in computer memory.

The microseismic data which is received may be subjected to one or more initial processing steps, such as separating different stages of a multistage fracturing process, or eliminating events of high uncertainty, before separation of selected data into the subset associated with fracture(s) produced by the hydraulic fracturing event and the remainder dataset.

In some forms of this invention, identifying the subset comprises creating a Voronoi diagram of the microseismic events, wherein the Voronoi diagram comprises a plurality of cells, each of the plurality of cells being associated with one of the microseismic events;

determining a density for each of the cells;

identifying high density cells;

creating a connectivity matrix of the high density cells;

identifying event clusters in the connectivity matrix; and identifying event clusters aligned with a main growing direction of the hydraulic fracture.

In some embodiments of the present invention, a system for characterizing natural fracture networks or other textural networks in an Earth formation is provided, the system comprising:

a plurality of receivers for receiving microseismic data from a hydraulic fracturing event; and a processor configured to identify and remove a subset of the microseismic data related to one or more fractures generated by the fracturing event and to characterize the natural fracture networks or other textural networks from the remaining microseismic data.

In aspects of the present invention, the characterization of the natural fracture network, or other textural networks may be used in/processed as part of a reservoir model, where the reservoir model may characterize the formation and a reservoir, such as a hydrocarbon reservoir or the like, surrounding a borehole in which the hydraulic fracturing event was performed. In other or similar aspects of the present invention, the characterization of the natural fracture network, or other textural networks may be used in/processed as part of a production model/analysis of current or potential production of hydrocarbons through the wellbore in which the hydraulic fracturing event was performed and/or one or more related wellbores. In yet other aspects, the characterization of the natural fracture networks or other textural networks in the Earth formation may be used to monitor, manage and/or plan hydraulic fracturing of the Earth formation.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

The present invention will become more fully understood from the following detailed description and the accompanying drawings given by way of example, wherein.

DETAILED DESCRIPTION OF THE INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. One or more processors, which may be computer(s) may perform the necessary tasks.

Embodiments of the present invention provide for characterizing natural fracture networks or other textural networks in an Earth formation. In an embodiment of the present invention, microseismic data obtained from a hydraulic fracturing event may be processed to provide for the characterization of the natural fracture networks or other textural networks in the Earth formation.

Figure 1:
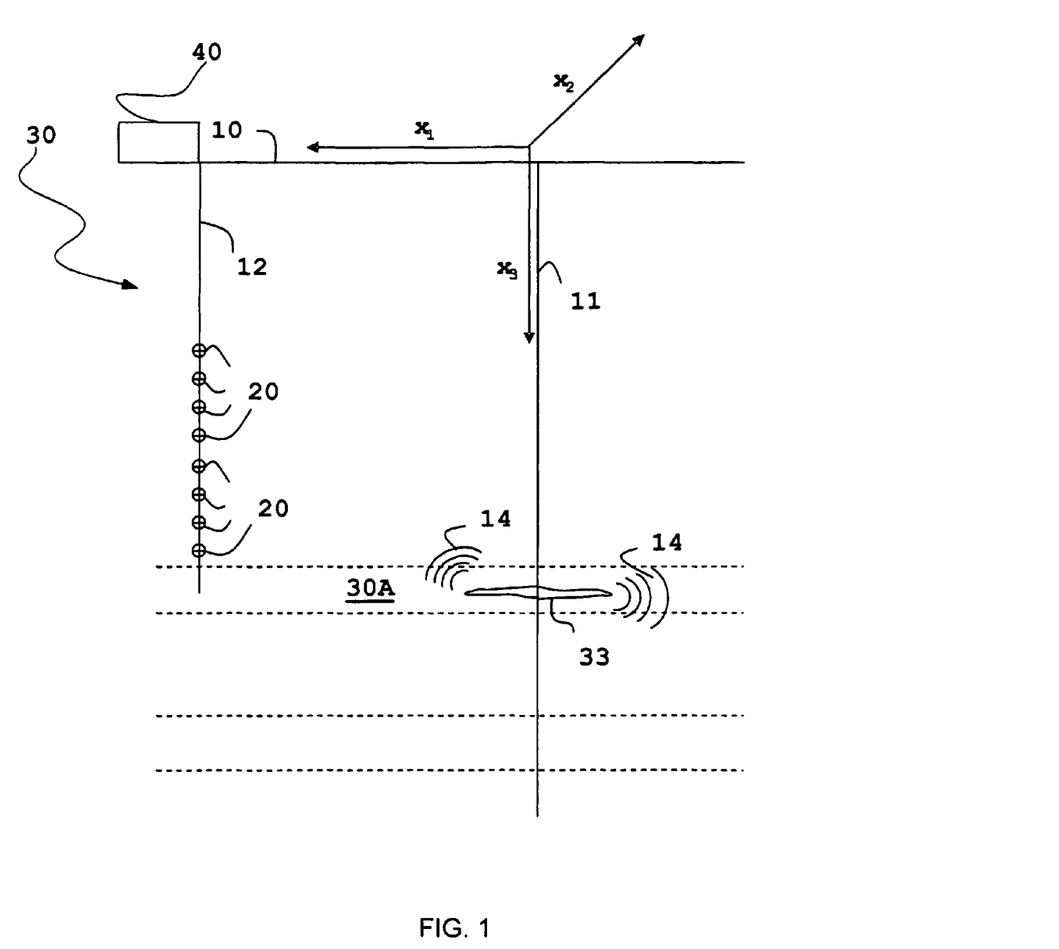
FIG. 1 is a schematic type illustration of a system for obtaining microseismic data related to hydraulic fracturing.

FIG. 1 is a schematic type illustration of a system for obtaining microseismic data related to hydraulic fracturing in accordance with an embodiment of the present invention. As depicted, a monitoring borehole 12 is positioned near a fracturing borehole 11; both the monitoring borehole 12 and the fracturing borehole 11 extending from a surface 10 through an Earth formation 30. A geophone array 20 may be disposed in the monitoring borehole 12. The geophone array 20 may comprises a plurality of geophones. In some aspects the geophones may comprise three-component geophones. Merely by way of example, the monitoring borehole 12 may be of the order of hundreds of meters from the fracturing borehole and the geophones in the geophone array 20 may be spaced of the order of tens of meters apart.

During hydraulic fracturing, a fluid (not shown) is pumped from the surface 10 into the fracturing borehole 11 so as to cause the Earth formation 30 surrounding the fracturing borehole 11 to fracture, resulting in the generation of a fracture 33 in the Earth formation 30. In the hydrocarbon industry, the fluid may be pumped down the fracturing borehole 11 to provide for the fracturing of a hydrocarbon bearing layer 30A in the Earth formation 30. In such an arrangement where the portion of the Earth formation 30 being fractured is the hydrocarbon bearing layer 30A, the fracture 33 is produced at least partially within the hydrocarbon bearing layer 30A. By generating the fracture 33 at least partially within the hydrocarbon bearing layer 30, production channels may be set up in the hydrocarbon bearing layer 30A allowing for flow of the hydrocarbons in the hydrocarbon bearing layer 30A through the Earth formation 30 to the fracturing borehole 11.

One possibility is that the hydrocarbon bearing layer is a shale. A reservoir which is a shale is generally of low permeability and is stimulated by fracturing in order to achieve production, but incorporates natural fractures which become connected to the newly-formed fracture.

During the fracturing process, acoustic waves 14 are generated by the fracture 33 and the acoustic waves 14 may propagate through the Earth formation 30 and be detected by the geophone array 20. As such, the geophone array 20 in the monitoring borehole 12 may be used to collect microseismic data related to the hydraulic fracturing procedure taking place in the fracturing borehole 11. The geophones in the geophone array may comprise three-component geophones and may provide directional (three-dimensional) data for the received acoustic waves 14. The data received by the geophone array 20 may be recorded and then processed and/or transmitted to a processor 40 for processing. In alternative embodiments of the present invention, more than one monitoring borehole 12 may be used and/or geophones may be located at the surface 10 or other locations.

The geophones are used to record microseismic wavefields generated by the hydraulic fracturing. By inverting the obtained microseismic wavefields, locations of microseismic events may be determined as well as uncertainties for the determined locations, source mechanisms and/or the like. As mentioned earlier, the set of event locations and the corresponding uncertainties is known as the microseismic event cloud.

Figure 2:
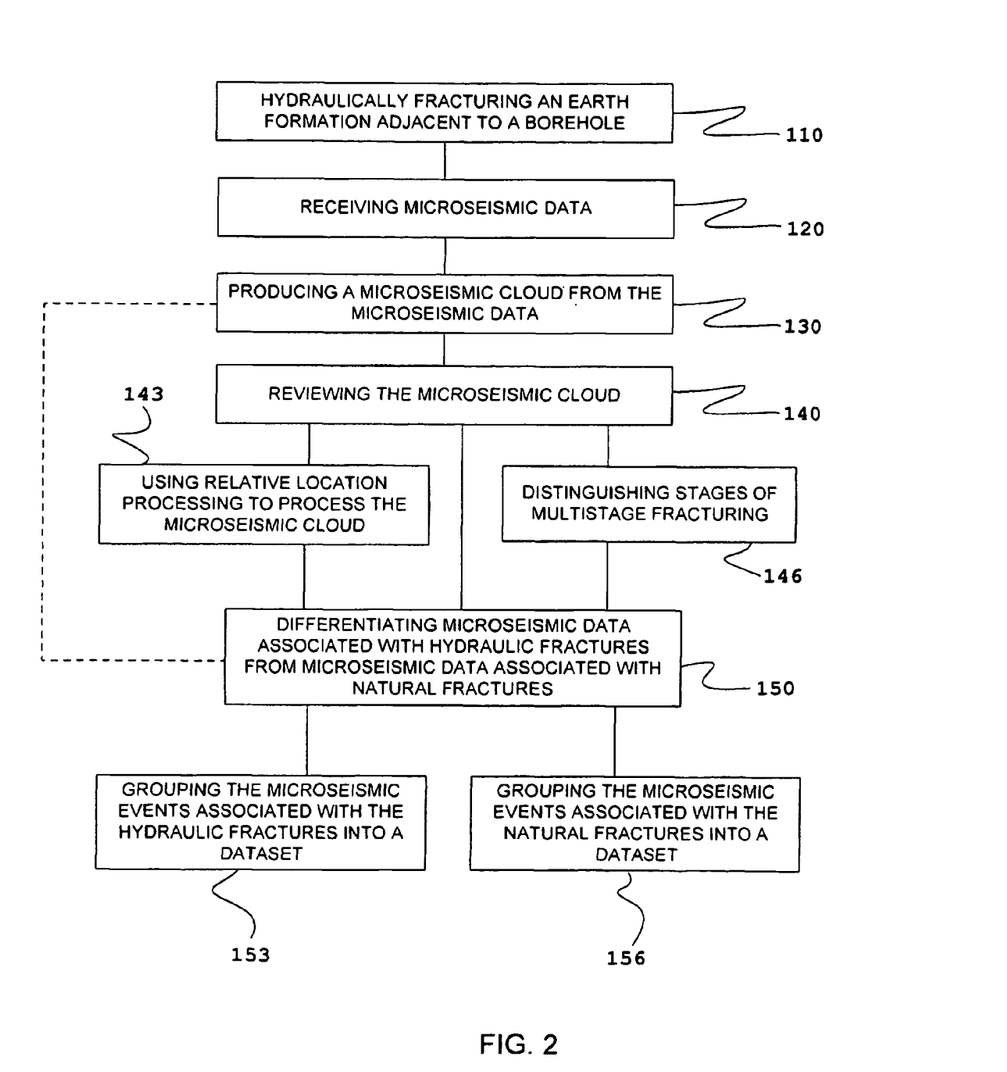
FIG. 2 is a flow-type illustration of processing microseismic data associated with one or more hydraulic fracturing events to characterize natural fracture networks or the other textural networks in the vicinity of the hydraulic fracturing event(s), in accordance with an embodiment of the present invention.

FIG. 2 is a flow-type illustration of processing microseismic data associated with one or more hydraulic fracturing events to characterize natural fracture networks or the other textural networks in the vicinity of the hydraulic fracturing event(s), in accordance with an embodiment of the present invention.

In step 110, an earth formation adjacent to a borehole is fractured by pumping fluids into a zone of the borehole generating hydraulic pressure in the zone and fracturing the Earth formation adjacent to the zone. The hydraulic fracturing process may comprise pumping fluids and the like into the wellbore to generate a fracture or plurality of fractures. Often, the fracturing process comprises multi-stage fracturing where hydraulic pressures are built up in multiple locations along the wellbore to create a plurality of fractures along the wellbore, thereby generating multiple fractures in the Earth formation.

In step 120, microseismic data is received. The generation of one or more fractures in the Earth formation produces microearthquakes (microseisms) or acoustic emissions associated with either the creation of the fracture or the induced movement of pre-existing fractures, which may comprise natural fractures in the Earth formation and/or natural textural networks in the Earth formation. In aspects of the present invention, a set of geophones may be positioned to detect the acoustic emissions generated by the hydraulic fracturing. The geophones may be arranged in an array and the array may be positioned in a monitoring borehole.

Figure 3A:
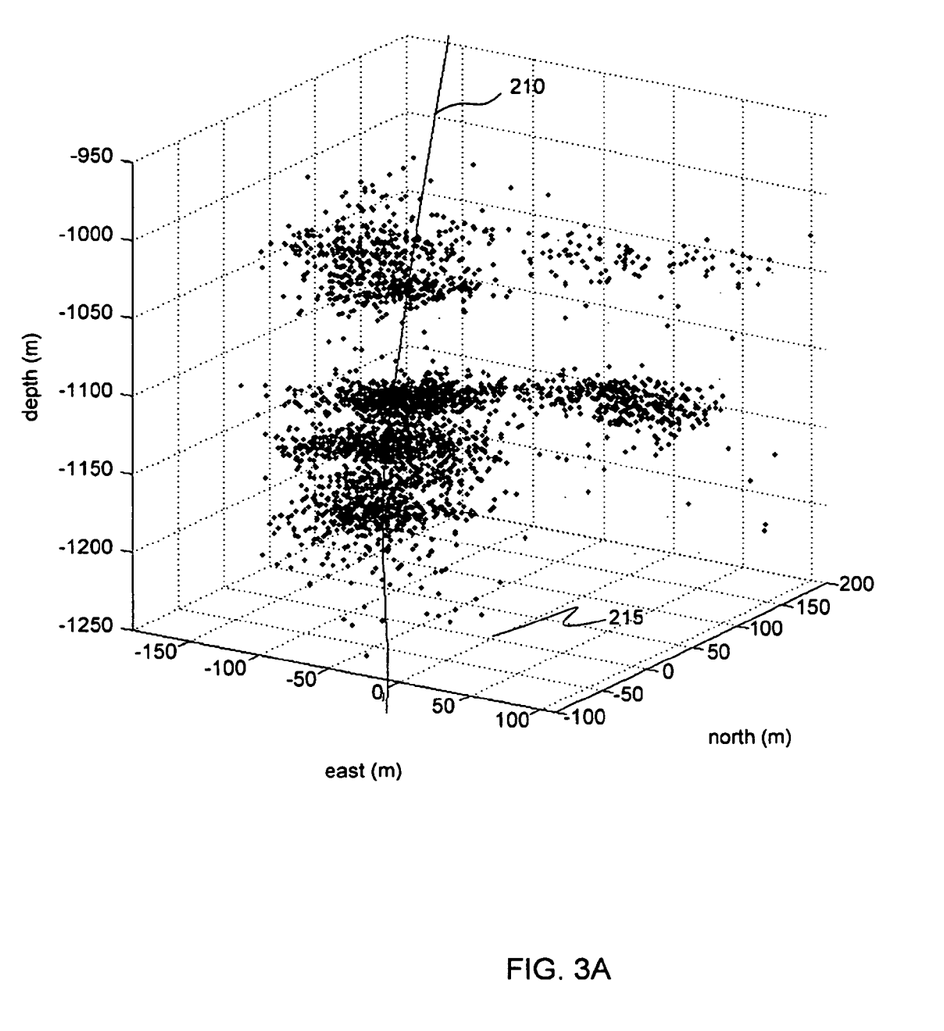
FIG. 3A illustrates a microseismic cloud processed from microseismic data obtained from a fracturing event.

In step 130, the microseismic data received by the geophones is processed to determine a presence and location of microseismic events in the data and these microseismic events are then be combined to form the cloud of microseismic events. In the following description the terms microseismic cloud and event cloud may be used interchangeably. During a hydraulic fracturing process, a cloud of microseismicity is generated in the vicinity of the generated hydraulic fracture. Often, the microseismic cloud evolves even after stimulation operations have ended. The microseismic cloud comprises microseisms that are: (i) on, and immediately adjacent to, the newly created hydraulic fracture(s); and (ii) induced on natural fractures, or other textural elements, in the vicinity of the hydraulic fracture(s). Here, the term "vicinity" may be considered as meaning any point in space that is influenced by the presence of the hydraulic fracture As an illustration, FIG. 3A illustrates a microseismic cloud processed from microseismic data obtained from a fracturing event, in accordance with an aspect of the present invention. The microseismic cloud in FIG. 3A is generated by a fracturing process that was initiated from a hydraulic fracturing borehole 210. In FIG. 3A the location and depth of the microseisms are defined relative to an origin 215 that is defined by a location of the top of a monitoring borehole (not shown) on the surface of the Earth formation. The microseismic data is recorded by geophones positioned in the monitoring borehole. The locations of the microseisms may be determined using techniques such as Coalescence Microseismic Mapping See. Drew J., Leslie H. D., Armstrong P., and Michaud, G.: AUTOMATED MICROSEISMIC EVENT DETECTION AND LOCATION BY CONTINUOUS SPATIAL MAPPING. Society of Petroleum Engineers ("SPE") No. 95513, Dallas, Tex., USA, October 2005; Eisner, L., Fischer, T., Jechumtalova, Z., Le Calvez, J., Hainzl, S. and Bouskova, A., NEW ANALYTICAL TECHNIQUES TO HELP IMPROVE OUR UNDERSTANDING OF HYDRAULICALLY INDUCED MICROSEISMICITY AND FRACTURE PROPAGATION, SPE No. 110813, presented at the SPE Annual Technical Conference and Exhibition, Anaheim, Calif., USA, 11-14 Nov., 2007; Michaud, G. and Le Calvez, J. (the entire content of which references is incorporated herein for all purposes). Geological structure may often be determinable by the naked eye from the microseismic cloud The microseismic cloud may be reviewed at step 140. The review may be performed by an operator of the microseismic processing and/or performed by a processor. In step 140, the microseismic cloud may be reviewed to determine whether further processing is required before differentiation of the data of the microseismic cloud into hydraulic fracture data and natural fracture data. In some cases, the microseismic cloud may, without further processing, be identifiable with geographic structures and, therefore, in a state for differentiation processing into microseismic data associated with hydraulic fractures and microseismic data associated with natural fractures. In other situations and in some embodiments of the present invention, the seismic cloud may be processed further, prior to the differentiation processing.

Figure 3B:
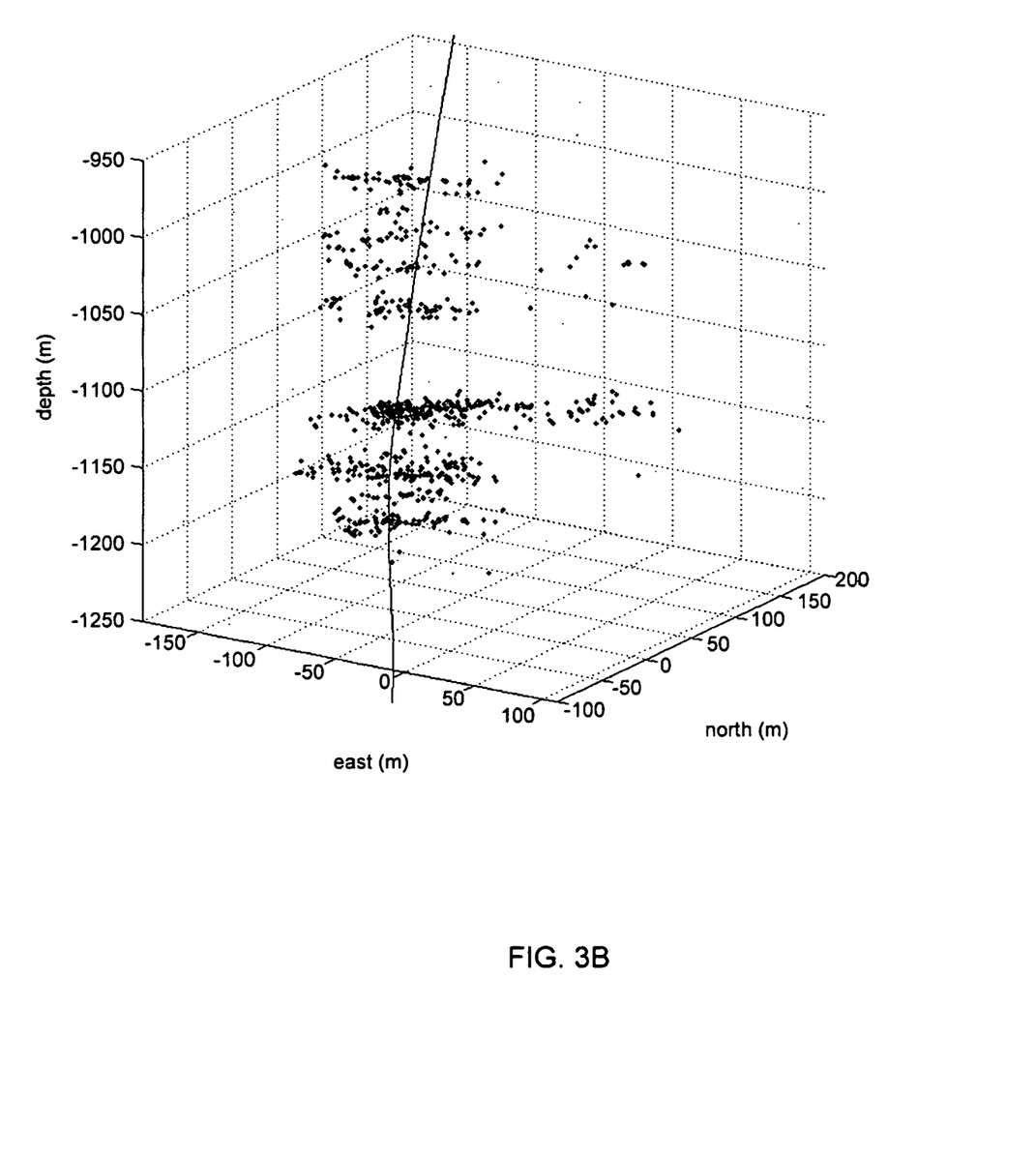
FIG. 3B illustrates a microseismic cloud processed from received microseismic data using a multi event processing technique.

In step 143, a processing technique may be used to process the seismic cloud and improve the relative locations of the microseismic events in the microseismic cloud. Processing techniques such as Joint Hypocenter Determination, the Collapsing algorithm, semi-automated relative picking and/or the like may be used to improve the relative locations of the microseismic events in the obtained microseismic cloud. FIG. 3B illustrates a microseismic cloud processed from received microseismic data using a multi event processing technique. After the processing, areas of concentration of the microseisms along the hydraulic fracturing borehole 210 may be visible to the naked eye.

In some circumstances, and hence in some embodiments of this invention, it may be desirable to process the data in order to identify locations of hydraulic fractures. For instance, a predicted direction of propagation of the hydraulic fracture being generated by a hydraulic fracturing procedure may not be reliable in cases where the hydraulic fracturing takes place in deviated well sections and/or where the influence of formation textural properties overwhelm stress effects. Also, in hydraulic fracturing procedures in the hydrocarbon industry, there are situations, such as in multi-stage fracturing or the like, where multiple hydraulic fractures may be created and, as a result, microseismicity is distributed at many depths throughout the hydrocarbon bearing zone of the Earth formation being fractured (often referred to as the production zone or the hydrocarbon reservoir), and the microseismicity may often extend deep into the reservoir, i.e., far away from the wellbore).

In a hydraulic fracturing procedure, microseismicity on the hydraulic fracture, on the immediate flanks of the hydraulic fracture and just ahead of the crack tip of the hydraulic fracture is both spatially and temporally dense compared to other microseismicity. Consequently, the location of the hydraulic fracture(s) produced by the hydraulic fracturing procedure may be identified by identifying locations of high and/or the highest density of microseismic events.

Step 146 is analysis to identify fractures formed at different stages of a multistage fracturing process. When there is such analysis of a multistage fracturing process, as in step 146, either the microseismic cloud as provided in Step 130 or the processed microseismic cloud as provided in Step 143 may be further processed to distinguish the stages of the multistage fracturing process.

In accordance with an embodiment of the present invention, to identify/distinguish microseismicity associated with different stages of a multistage fracturing process, a Radon-transform based algorithm or the like may be to identify planes and/or straight lines in the microseismic cloud. In accordance with such an embodiment, the points/microseismic events making up the microseismic cloud may be projected onto a line. Merely by way of example. the line may comprise a vertical line, a horizontal line or a line coincident with the trajectory of the well. A density-type analysis of the microseismic events as projected onto the line may then be performed.

Figure 3C:
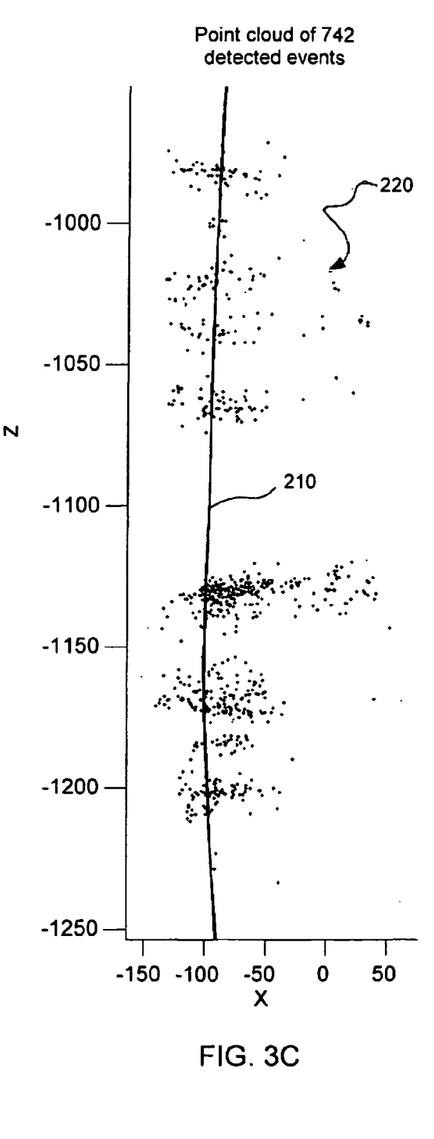
FIGS. 3C and 3D illustrate, in accordance with an embodiment of the present invention, projecting a cloud of microseismic events onto a straight line and processing the microseisemic events into a density histogram.
Figure 3D:
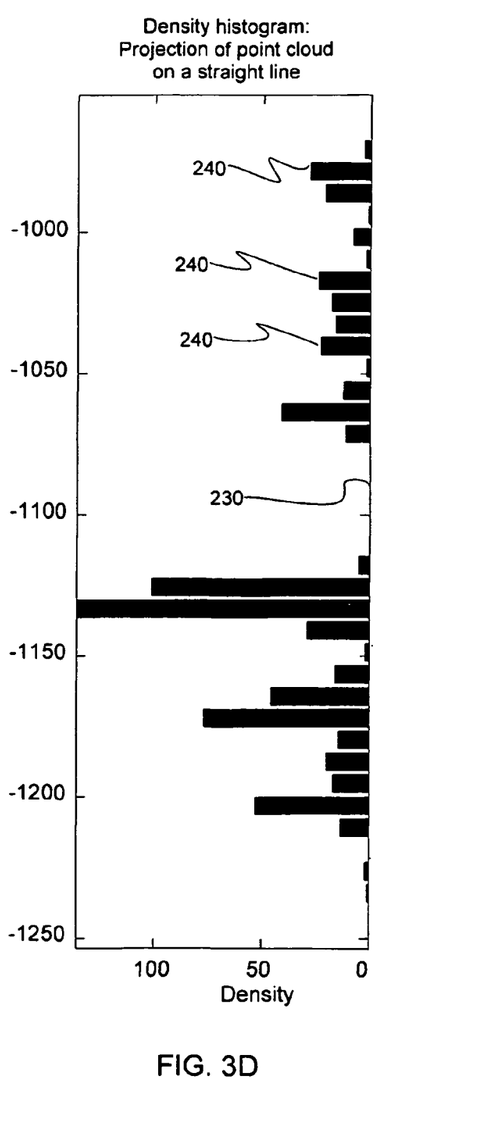

FIGS. 3C and 3D illustrate, in accordance with an embodiment of the present invention, projecting a cloud of microseismic events onto a straight line and processing the microseismic events into a density histogram. A point cloud of microseismic events 220 is projected onto a line of projection 230 and the line of projection 230 is partitioned into adjacent and equal-sized bins 240—where each of the bins 240 is equivalent to a small section of the line of projection 230. A density function is defined along the line of projection 230 for the projected events. The density value for each of the bins 240 corresponds to the number of events projected in that bin.

A portion of the line of projection 230 that includes the highest density of microseismic events may be defined as a cluster. All of the microseismic events whose projections fall in the high-density bin are classified as part of the same cluster and may be extracted from the dataset. A principal component analysis, which is a commonly used technique for finding patterns in data of high dimension, may then be applied to the spatial coordinates of the microseismic events of the extracted cluster to characterize the structure of the cluster—e,g., is the cluster of events characterized in a plane, a straight line and/or the like. The steps of identifying a portion of the line of projection 230 that includes the highest density of microseismic events, defining the microseismic events in the identified portion of the line of projection 230 and/or bin as a cluster, extracting all of the microseismic events whose projections fall in the high-density bin/portion of the line of projection from the dataset and applying a principal component analysis to the spatial coordinates of the microseismic events of the extracted cluster may be repeated until the number of events not assigned to the identified clusters is small compared to the total number of events.

In some embodiments of the present invention, statistical analysis, modeling, functional analysis, comparative analysis and or the like may be used to identify the clusters and/or identify the microseismic events within the clusters. Merely by way of example, clusters may be characterized/identified by identifying a portion of the line of projection 230 that has one of the following features: includes a density peak; is defined by the highest density of microseismic events; contains one or more bins with density values greater than a background density value; contains one or more bins with density values above a threshold density value, and /or contains one or more bins defining a peak in density with minima at either extreme of the portion of the line of projection 230. In some embodiments, by identifying the clusters of microseismic events the clusters can be further processed to identify characteristics of the cluster, such as the space occupied by the microseismic events in the cluster, the shape/location of the occupied space, the density distribution of microseismic events in the space and/or the like.

Figure 3E:
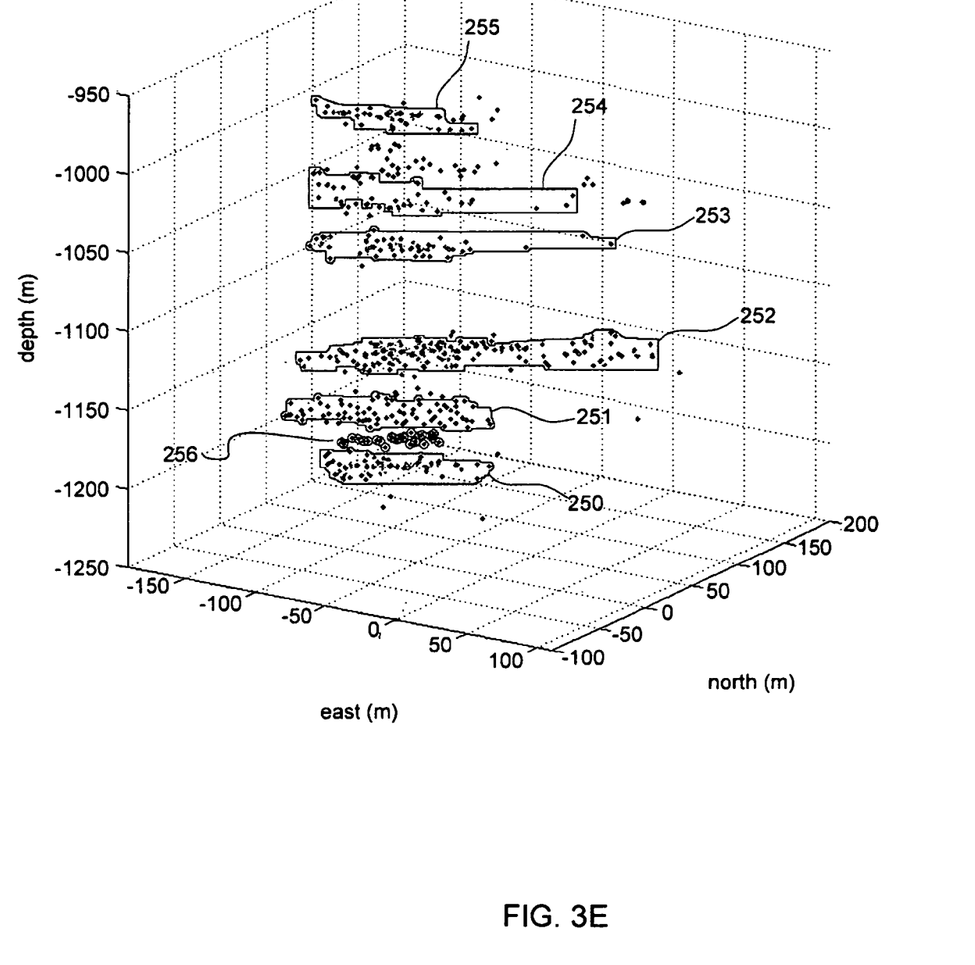
FIG. 3E illustrates clusters of microseismic events associated with individual stages of a multi-stage fracturing job that have been identified and categorized according to location.

FIG. 3E illustrates clusters of microseismic events associated with individual stages of a multi-stage fracturing job that have been identified and categorized according to location at step 146. Each of the outlines 250-255 has been drawn around a cluster of microseismic events identified as a single stage of fracturing. To avoid drawing outlines too close together, the events associated with one stage 256 between stages 250 and 251 is shown with circles round the events. If required, a temporal criterion may be used to account for microseismicity associated with cross-stage fracturing.

Furthermore, in some embodiments of the present invention, the microseismic events associated with one or more of the clusters may be identified and data outside of the data associated with the one or more selected clusters may be filtered/removed from the dataset so that the remaining data is data associated with one or more stages of the fracturing process.

In accordance with the invention, at step 150, microseismic data associated with hydraulic fracturing is differentiated from microseismic data associated with natural fractures. In various embodiments of the present invention, either lower microseismic precision data, such as provided in Step 130, or higher precision microseismic data in which relative locations have been processed such as provided in Step 143 and/or microseismic data that has been filtered to distinguish stages of a multistage fracturing process as in step 146 may be input to the differentiation procedure.

In Step 150, the microseismic cloud is processed so as to comprise/be considered as the set of E events. In this set, events with high uncertainty may be removed from the cloud, where events with higher uncertainty may be chosen through the volume of the uncertainty ellipsoids or using an error estimator when such data is available. Uncertainty ellipsoids quantify the volume within which the location of the microseismic event lies. After removing the high uncertainty events a subset $E^{hc} \subset E$ of high confidence events is yielded.

In an embodiment of the present invention, a Voronoi diagram of the obtained event cloud/microseismic cloud after the removal of the high uncertainty events is built. The Voronoi diagram consists of convex polyhedron cells where each cell is attached to one event and contains the space that is closer to this event than to any of the other events in the event cloud/microseismic cloud. In embodiments of the present invention, density values may be computed for each event according to the volume of the event's convex polyhedron cell in the Voronoi diagram.

For each event in the subset $i \in E^{hc}$, the volume of its cell is denoted $V_c^i$. The density value $d_i$ corresponding to the volume $V_c^i$ may be obtained from the following:

$$d_i = \frac{\min(V_c^i)}{V_c^i} \text{ for } i \in E^{hc} \qquad (1)$$

From Equation 1 it can be seen that the density value $d_i$ is inversely proportional to the volume of the Voronoi cell containing the event.

Clusters of high density events may be identified by setting a threshold value $\alpha$, where $0 \le \alpha \le 1$ and the high density subset $E^{hd}$ where $E^{hd}$ is a subset of $E^{hc}$ ($E^{hd} \subset E^{hc}$) which is defined as:

$$E^{hd} = \{i \in E^{hc}; d_i \ge \alpha\} \qquad (2)$$

Having defined the subset $E^{hd}$, a connectivity matrix may be computed for the events in $E^{hd}$, where in the connectivity matrix two events are considered as being connected if the respective cells containing the two events share a point, an edge or a face. In an embodiment of the present invention, the connectivity matrix may be used to describe a mathematical graph. In an embodiment of the present invention, the connected components are identified/described/built in the mathematical graph and this identifying/describing/building of the connected components in the graph yields clusters.

Figure 3F:
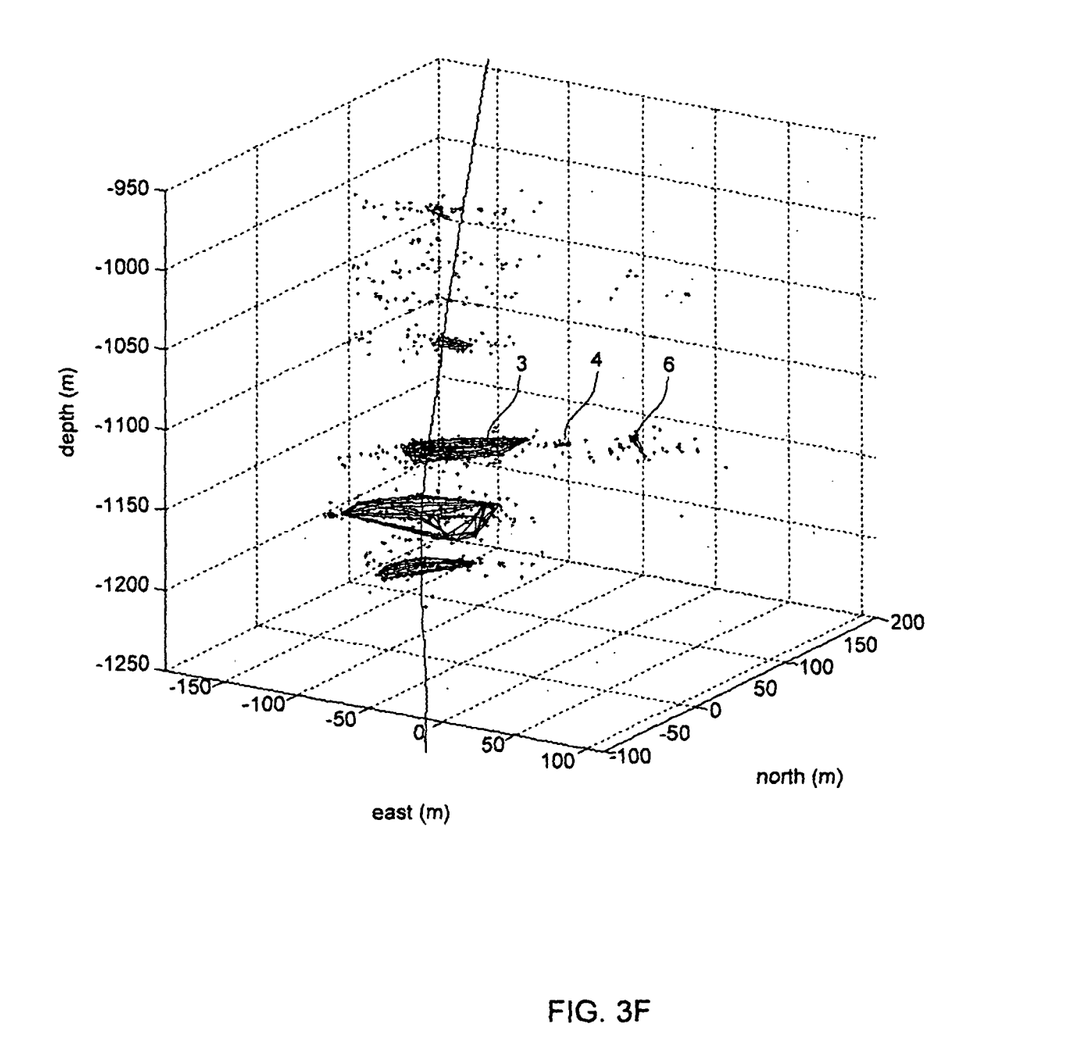
FIG. 3F, illustrates the results of the Voronoi cell-density-connectivity matrix analysis on the microseismic cloud.

FIG. 3F illustrates the results of the Voronoi cell-density-connectivity matrix analysis on the microseismic cloud. Looking at the clusters numbered "3", "4" and "6" in FIG. 3F, it can be understood that these clusters are aligned along a line parallel to the maximum principal stress direction developed by the hydraulic fracturing and, as such, comprise microseismic events on, or immediately adjacent to, the hydraulic fracture. The gap between these clusters can occur for many reasons; one important reason may be that the zone in between clusters may lie on a nodal plane since no seismic energy will be detected from events in such a zone.

In an embodiment of the present invention, where clusters can be identified as being aligned along a line/direction parallel to the maximum principal stress direction developed along the hydraulic fracturing, the processed density values may be refined by taking the main growing direction (D) of the fracture into account (which is usually equal to the maximum principal stress direction) according to the following process:

(a) One of the clusters is identified according to its quality for giving precisely the growing direction of the hydraulic fracture, where the cluster is identified by processing the cluster with a shape similar to an ellipsoid whose size in one direction (i.e. axis, where the ellipsoid may be considered as having three axes in three dimensions) is far greater than the two other directions/axes;

(b) A principal component analysis is performed on the identified cluster. The result of this principal component analysis is that the principal directions of the cluster may be identified. These principal directions are orthogonal to each other and such that the covariance matrix of the events in the reference frame built with these directions is diagonal. Thus, the secondary results of the principal component analysis are that the values of the variances $\sigma_1$, $\sigma_2$ and $\sigma_3$ in the principal direction of the cluster may be determined, where $\sigma_1 \leq \sigma_2 \leq \sigma_3$. These variances provide a quantitative measure of the correlation between a principal direction and the data.

(c) Parameters are processed so as to scale the cluster to provide that $\sigma_3$ becomes $\sigma_3 = \sigma_2$ keeping the other variances the same so that events belonging to patterns orientated along the direction (D) are given a higher density. The processed parameters are applied to and used to scale the whole data set $E^{hc}$; and (d) Processing by means of a Voronoi diagram and identification of high density clusters is repeated until the change to clusters due to this iterative process becomes negligible and/or the iteration produces a change in the clusters that is below a set threshold value.

In an embodiment of the present invention, by iteratively processing the data produced from the Voronoi cell analysis, events belonging to the clusters oriented along the direction (D) are given a higher density then clusters that are not so aligned. An illustration of a result of this processing of a microseismic cloud from a multistage hydraulic fracturing process is provided in FIG. 3G.

Figure 3G:
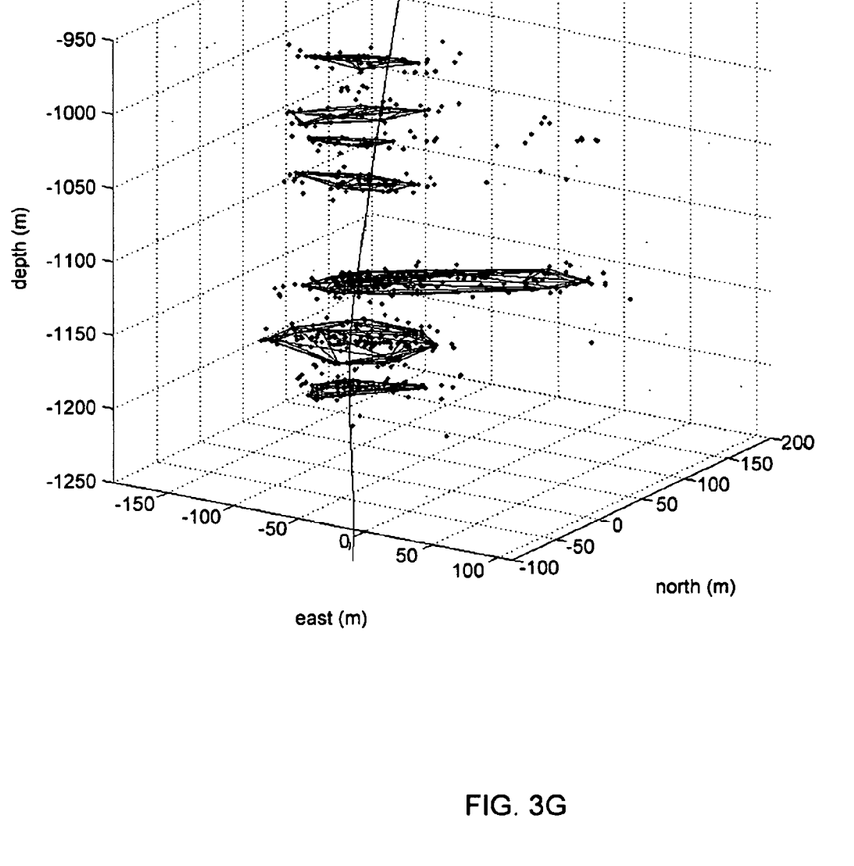
FIG. 3G illustrates a result of processing of a microseismic cloud from a multistage hydraulic fracturing process by giving events oriented along the main growing direction of a hydraulic fracture (D) a higher density.

In an embodiment of the present invention in which the separation by fracturing stages is not applied to the microseismic cloud/dataset, then some or all of top four clusters shown in FIG. 3G would have coalesced, where the level of coalescence depends on the density threshold value chosen. This coalescence would occur because the point cloud density in the vertical and the maximum principal stress directions are comparable.

In Step 153 in accordance with an embodiment of the present invention, the microseismic events in the processed microseismic data that fall within and/or are on the boundary of one of the high density clusters are grouped together into a subset (i.e. first data set) herein denoted as "Set 1". Set 1 predominantly contains events on the hydraulic fracture, on its immediate flanks and just ahead of a crack tip of the hydraulic fracture. Set 1 may also contain some events that have occurred on natural fractures/faults since the processing and/or the position of the occurrence of such natural fracture events may not allow for complete differentiation.

In Step 156, in accordance with an embodiment of the present invention. The microseismic events in the processed microseismic data set that are not in Set 1 are grouped together into a remainder dataset, herein denoted "Set 2". As processed in accordance with an embodiment of the present invention, Set 2 predominantly contains events on natural fractures/faults. Again, because of the processing and/or the position of the occurrence of such hydraulic fracture events, Set 2 may also contain some events that are on the hydraulic fracture, on its immediate flanks and just ahead of the crack tip.

Figure 4A:
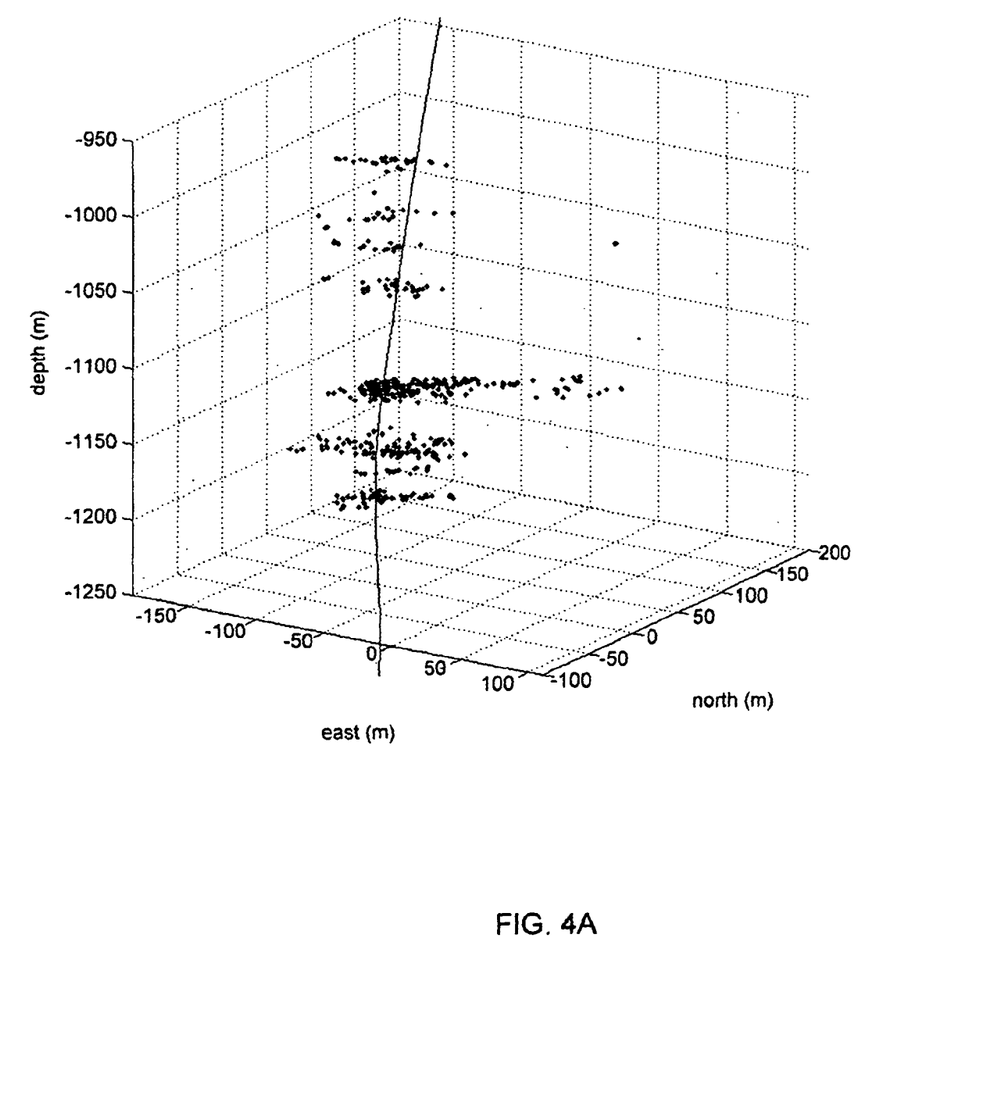
FIG. 4A illustrates the microseismic events contained in Set 1, where Set 1 comprises the microseismic events in the processed microseismic data that fall within and/or are on the boundary of one of the high density regions after processing the microseismic cloud.

FIG. 4A illustrates the microseismic events contained in Set 1 after processing the microseismic cloud.

Figure 4B:
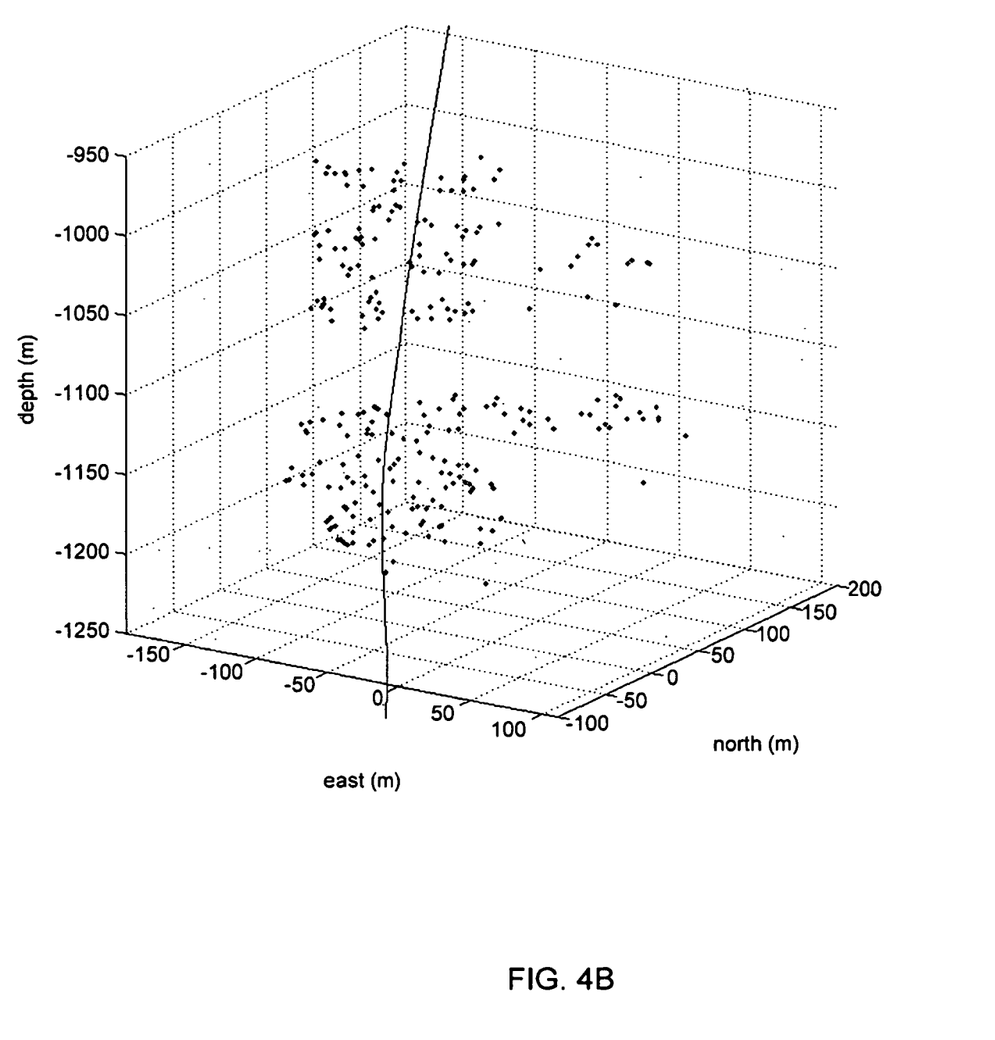
FIG. 4B illustrates the microseismic events contained in Set 2, where Set 2 comprises the microseismic events in the processed microseismic data set that are not in Set 1 after processing the microseismic cloud.

FIG. 4B illustrates the microseismic events contained in Set 2 after processing the microseismic cloud.

By separating the microseismic events associated with the hydraulic fractures from the seismic events associated with natural fractures the two data sets can be further analyzed to provide a more precise understanding of the hydraulic and natural fractures. Moreover, by using the process of the present invention, data from hydraulic fracturing processes may be used to obtain data and an understanding of the natural fracture systems in the location of the hydraulic fracturing process. This understanding of the natural fracture system may be used in wellbore modeling, for hydraulic fracture management, planning and/or control and/or the like.

While the principles of the disclosure have been described above in connection with specific apparatuses and methods, it is to be clearly understood that this description is made only by way of example and not as limitation on the scope of the invention.

What is claimed is:

1. A method for characterizing natural fracture networks or other textural networks in an Earth formation, comprising:
   detecting microseismic data from a hydraulic fracturing event using a plurality of geophones;
   transmitting the microseismic data to a processor;
   identifying a subset of the microseismic data associated with one or more fractures produced by the hydraulic fracturing event, wherein the subset of the microseismic data comprises components of the microseismic data associated with the one or more hydraulic fractures;
   obtaining a remainder dataset of the microseismic data by removing the subset from the microseismic data;
   processing the remainder dataset of the microseismic data, and
   characterizing the natural fracture networks or the other textural networks in the location of the hydraulic fracturing event,
   wherein the microseismic data is projected onto a line, the line is partitioned into adjacent bins, a density function is defined for the seismic data along the line and clusters of seismic data are identified along the line.

2. The method according to claim 1, wherein the microseismic data is processed to provide a cloud of microseismic events.

3. The method of claim 2 wherein the cloud of microseismic data is processed to select events of higher certainty and exclude events of lower certainty before identifying the subset.

4. The method according to claim 1, wherein the subset comprises microseismicity on and immediately adjacent to the one or more hydraulic fractures.

5. The method of claim 1, wherein the hydraulic fracturing event is generated in a borehole in the Earth formation.

6. The method according to claim 1, wherein the step of identifying the subset of the microseismic data associated with the one or more fractures produced by the hydraulic fracturing event comprises identifying planes or straight lines in the microseismic data.

7. The method according to claim 6, wherein the planes or straight lines are identified using a Radon-transform based algorithm.

8. The method according to claims 6, wherein a statistical analysis is used to identify the planes or straight lines.

9. The method according to claim 1, wherein the line comprises one of a horizontal line, a vertical line and a trajectory of the borehole.

10. The method according to claim 1, wherein spatial coordinates of the elements of the seismic data comprising the clusters are processed to characterize the structure of the cluster.

11. The method according to claim 6, wherein a density of the plane or the straight line is determined, and wherein the density is a function of the amount of seismic data associated with the plane or straight line.

12. The method according to claim 6, wherein a direction of the plane or the straight line is determined.

13. The method according to claim 12, wherein the step of identifying the subset of the microseismic data comprises identifying the seismic data associated with the plane or the straight line having a density above a statistical threshold and/or a particular direction.

14. The method according to claim 1, wherein knowledge of the microseismic event is used to identify the subset of the microseismic data.

15. The method according to claim 3 wherein identifying the subset comprises:
creating a Voronoi diagram of the microseismic events, wherein the Voronoi diagram comprises a plurality of cells, each of the plurality of cells being associated with one of the microseismic events;
determining a density for each of the cells;
identifying high density cells;
creating a connectivity matrix of the high density cells;
identifying event clusters in the connectivity matrix; and
identifying event clusters aligned with a main growing direction of the hydraulic fracture.

16. The method according to claim 1, wherein the step of processing the remainder dataset of the microseismic data to characterize the natural fracture networks or the other textural networks comprises identifying planes or straight lines in the remainder dataset.

17. The method according to claim 16, wherein the planes or straight lines are identified using a Radon-transform based algorithm.

18. The method according to claims 16, wherein a statistical analysis is used to identify the planes or straight lines.

19. The method according to claim 1, wherein knowledge of the Earth formation is used to process the remainder dataset of the microseismic data to characterize the natural fracture networks or the other textural networks identify the subset of the microseismic data.

20. The method according to claim 1, further comprising:
using the characterized natural fracture networks or the characterized other textural networks in a reservoir model.

21. A method for characterizing natural fracture networks or other textural networks in an Earth formation, comprising:
detecting microseismic data from a hydraulic fracturing event using a plurality of geophones, wherein the hydraulic fracturing event creates one or more hydraulic fractures in the Earth formation;
transmitting the microseismic data to a processor;
generating a seismic cloud of microseismic events from the received microseismic data;
creating a set E of the microseismic events in the microseismic cloud;
removing high uncertainty microseismic events from the set E;
creating a Voronoi diagram of the microseismic events in set E, wherein the Voronoi diagram comprises a plurality of cells each of the plurality of cells being associated with one of the microseismic events;
determining a density for each of the cells;
identifying high density cells;
creating a connectivity matrix of the high density cells;
identifying event clusters in the connectivity matrix;
identifying event clusters aligned with a main growing direction of the hydraulic fracture;
creating a first dataset of the microseismic events that are outside of the event clusters aligned with the main growing direction of the hydraulic fracture;
processing the first dataset, and characterizing the natural fracture networks or the other textural networks in the location of the hydraulic fracturing event.

22. A system for characterizing natural fracture networks or other textural networks in an Earth formation, comprising:
a plurality of geophones for receiving microseismic data from a hydraulic fracturing event;
a processor configured to identify and remove a subset of the microseismic data related to one or more fractures generated by the fracturing event, to process a remainder dataset of the microseismic data and to characterize the natural fracture networks or other textural networks from the remaining microseismic data in the location of the hydraulic fracturing event, and
means for transmitting the microseismic data from the plurality of geophones to the processor, and
means for projecting the microseismic data onto a line, wherein the line is partitioned into adjacent bins, means for identifying a density function for the seismic data along the line and means for identifying clusters of seismic data along the line.

23. The system according to claim 22, wherein the geophones are disposed in a borehole.

24. A computer program comprising code which, when run on a computer, causes the computer to carry out the method of claim 1.

25. A computer readable medium having a computer program according to claim 24 stored thereon.

* * * * *